F. P. MURPHEY.
CORN PLANTER.
APPLICATION FILED OCT. 22, 1910.
1,018,980.
Patented Feb. 27, 1912.
3 SHEETS—SHEET 1.
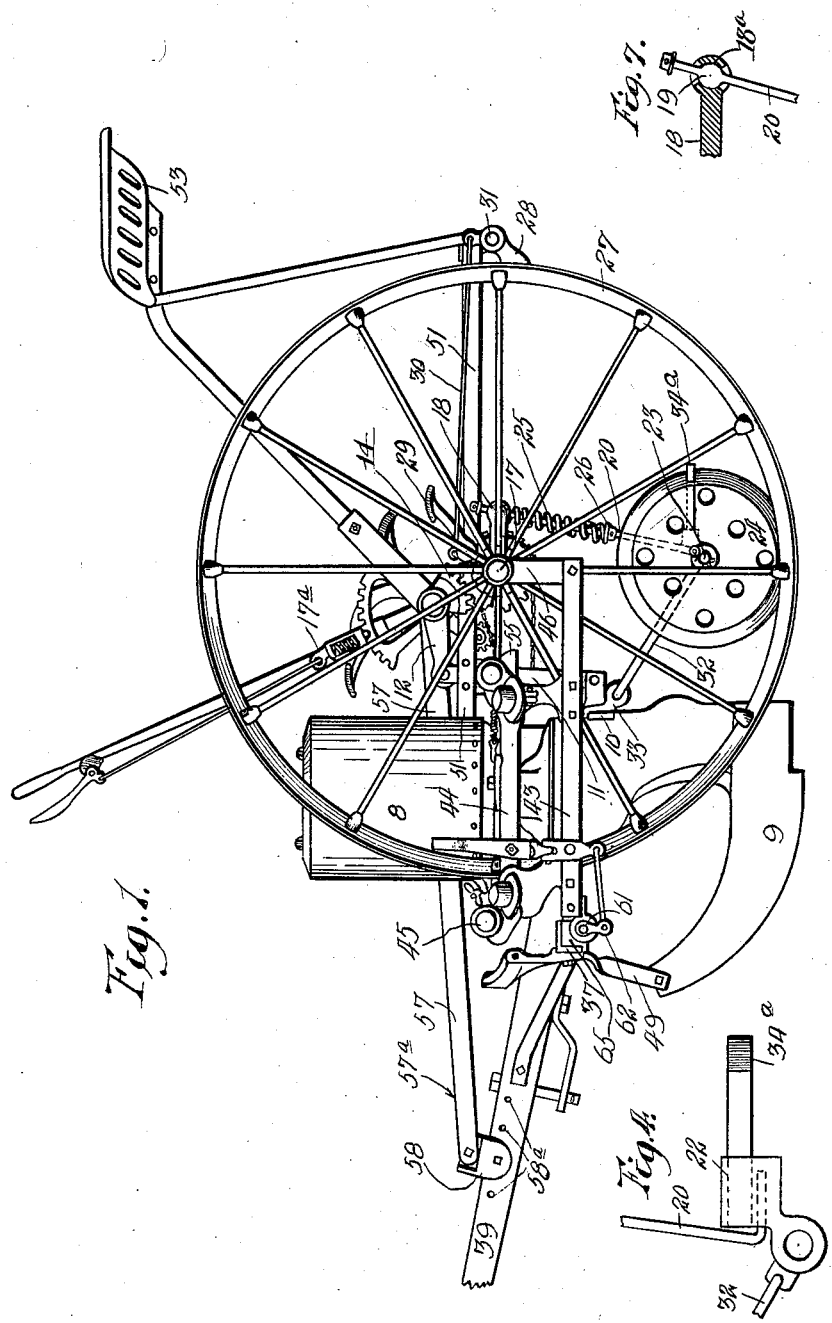
Witnesses:
Ephraim Banning
Inventor:
Frank P. Murphey.
By Banning & Banning
Attorneys.

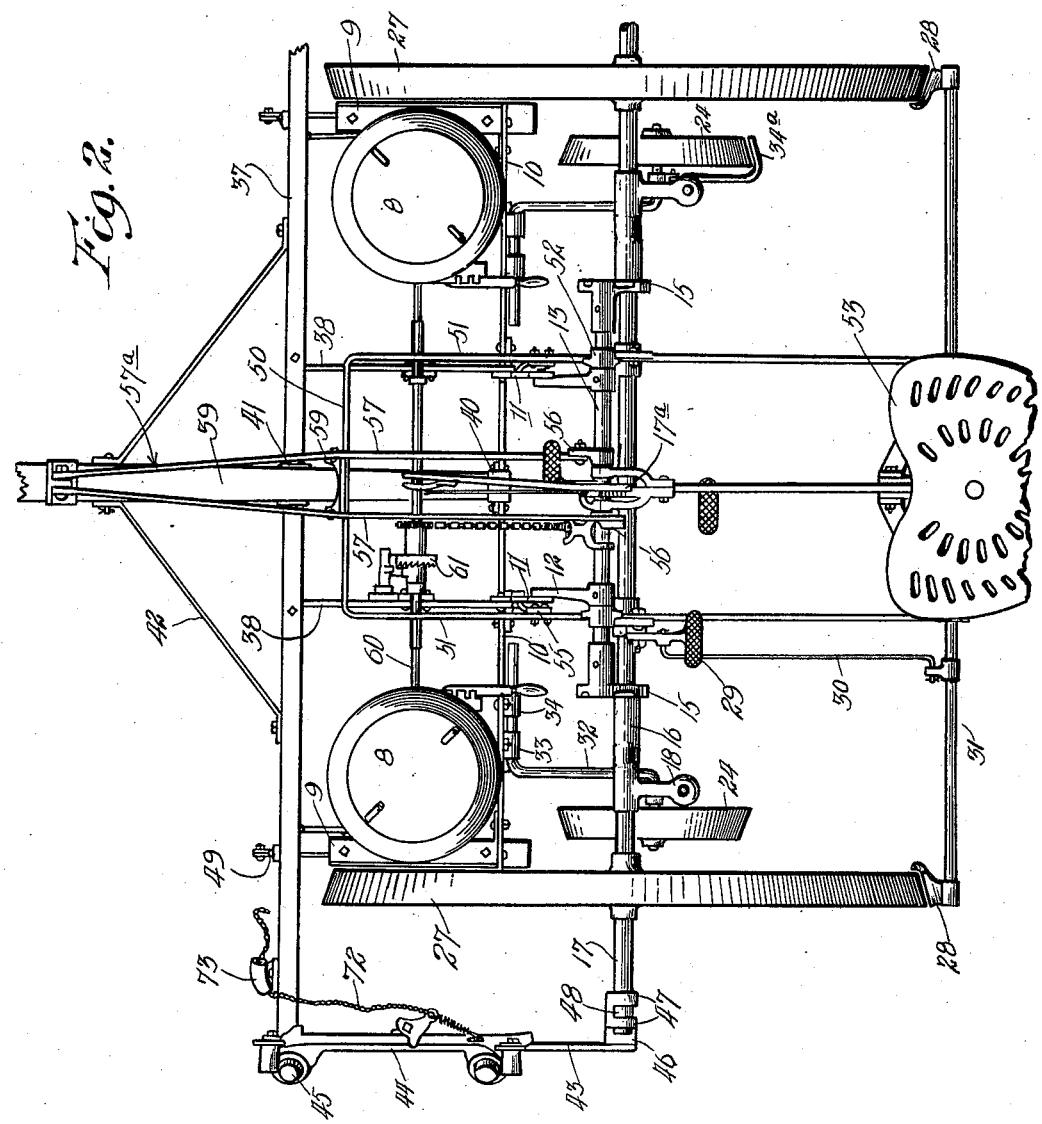

F. P. MURPHEY.
CORN PLANTER.
APPLICATION FILED OCT. 22, 1910.
1,018,980.
Patented Feb. 27, 1912.
3 SHEETS—SHEET 3.
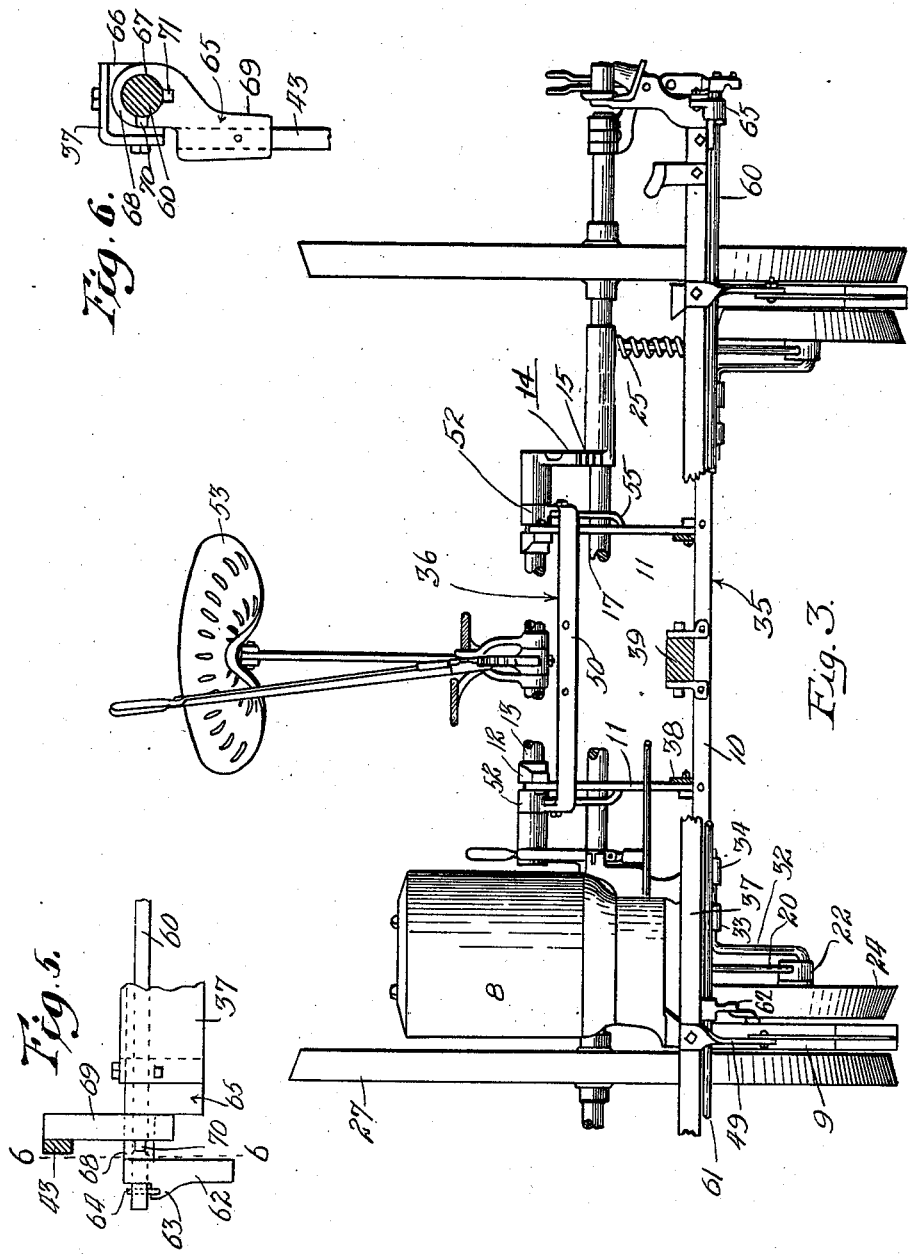

UNITED STATES PATENT OFFICE.

FRANK P. MURPHEY, OF DECATUR, ILLINOIS.

CORN-PLANTER.

1,018,980. Specification of Letters Patent. Patented Feb. 27, 1912.

Application filed October 22, 1910. Serial No. 588,442.

*To all whom it may concern:*

Be it known that I, FRANK P. MURPHEY, a citizen of the United States, residing at Decatur, in the county of Macon and State of Illinois, have invented certain new and useful Improvements in Corn-Planters, of which the following is a specification.

The present invention relates to the construction of the framework constituting the body of the planter; to the manner of arranging this framework, whereby a separate frame is provided for supporting the planter mechanism and for supporting the seat; to a connection between the framework supporting the planting mechanism and the inner covering wheels; to the construction and arrangement of the covering wheels; to the manner of adjusting the inner covering wheels and the shovels of the planting mechanism; and to the distribution and counterbalancing of the weight of the various portions of the planter.

Among the objects of the present invention the most important is: to so construct and arrange the outer or traction wheels that they will serve both as carrying and as covering wheels, when acting preferably in conjunction with a pair of inner covering wheels of smaller diameter, and so arranged with respect to the furrow openers that the latter will enter the ground at a point slightly in advance of the point of ground contact for the covering wheels and immediately in line with the space intermediate the two covering wheels.

A further object of the invention pertains to the means whereby the inner covering wheels may be adjusted in line with the furrow openers or at any other position with respect to the furrow opener that may be desired.

The invention further relates to the construction and manner of mounting the seed boxes, each of which is provided with a discharge from the outer side of the box at a point directly above the furrow openers, thereby enabling the seed boxes to be located in close proximity to and immediately inside of the outer carrying and covering wheels rather than at a point in advance of or above the rims of the wheels. This arrangement brings the discharge openings for the seed boxes into relatively close proximity to the ground, which facilitates drilling and at the same time brings the seed box in toward the supporting axle of the machine, thereby more nearly centering the weight.

The invention further relates to the formation and relative positioning of the covering wheels with respect to one another, and particularly to the beveled formation of the rims, which serve to throw the soil in from each side toward the opening created by the advancing furrow openers, thereby covering the grain without top contact from the covering wheel.

Further objects of the invention pertain to the construction and arrangement of the framework and to the means provided for adjusting the various portions of the machine with respect to one another.

The invention further consists in the features of construction and combination of parts hereinafter described and claimed.

In the drawings, Figure 1 is a side elevation of the planter of the present invention; Fig. 2, a plan view; Fig. 3, a front view having a portion of the mechanism broken away; Fig. 4, a detail of the casting forming the connection between the rods supporting the covering wheel and the covering wheel; Fig. 5, a detail showing the front view of the part connecting the forward end of the bar and supporting the runner; Fig. 6, a section on line 6—6 of Fig. 5 of the parts shown in Fig. 5; and Fig. 7, a detail showing the ball and socket connection of the rod supporting the covering wheel.

The device comprises planting mechanisms 8, consisting of differential dropping mechanism and shovels or furrow openers 9. The dropping mechanism can be of any type of construction capable of performing the necessary work, and the shovel 9 can also be provided with any form of valve mechanism suitable for the planting operation.

The construction and arrangement of the dropping mechanism and the valve mechanism form no part of the present invention, nor are the parts of the present invention in any way dependent upon the operation of these parts; hence, detailed description and illustration of these parts are not set forth at this time.

The shovels 9 are connected to a crossbar 10, to which are attached links 11 connected to crank arms 12, which are secured to a rock shaft 13, as best shown in Fig. 2. Mounted upon the ends of the rock shaft 13 are segments 14, which mesh with pinions 15 on a sleeve 16, which is mounted upon a main shaft 17; and the rock shaft is rotated and held in its rotated position by lever and segment mechanism 17ª. Attached to the sleeve 16, or formed integral therewith, is a lug 18 provided with a socket 18ª at its outer end, adapted to receive a ball 19 upon the end of a stem or rod 20, which rod is entered into a block 22, from which projects a trunnion 23 of an inner covering wheel 24, which covering wheel, as is shown more clearly in Fig. 2, lies upon the inner side of the shovel, and one of said wheels is provided for each shovel.

Constant downward pressure is maintained upon the inner covering wheels by means of a coil spring 25 which bears at one end against a washer 26, which is capable of being adjusted on the rod 20. Hence, by adjusting the position of this washer, the tension of the spring can be varied and the pressure exerted upon the covering wheels can be varied so as to cause them to enter to a greater or less extent into the ground. Thus, by means of this coil spring sufficient tension is placed on the inner covering wheels to have them perform their work in an efficient manner.

As will be seen from the drawings, the traction wheels 27 are beveled and form the outer covering wheels of the planting mechanism. By referring to Fig. 2, it will be seen that these outer traction wheels lie closely adjacent to the shovel of the planting mechanism, and hence are in a position to perform the functions necessary to a covering wheel. In providing a traction wheel which serves the function of a covering wheel, sufficient weight is given to this wheel to maintain it always in proper position to perform the covering operation. Therefore, no tension mechanism is necessary to govern the pressure on the outer covering wheels.

By reason of the close proximity to which the inner edge of the outer covering wheel is traveling to the outer edge of the shovel, a scraper 28 is provided for each of the traction wheels, which serves to keep the inner edge thereof free from the accumulation of dirt and while only one of the scrapers together with the mechanism for actuating the same is shown and described, it is understood that there is a scraper provided for each wheel and that they are exactly alike in construction and arrangement. The scraper is shown also extending over the periphery of the wheel in order to remove the dirt from that portion of the wheel. Each of the scrapers is thrown to acting position by a pedal 29 connected to a rod 30, which in turn is connected to a rock shaft 31, to which the scraper is attached, this rock shaft being journaled in the upper frame of the body of the planter.

In addition to being supported by the rod 20, each of the inner covering wheels is supported by a rod 32, which is pivotally mounted in the block 22, as shown more clearly in Fig. 4. As best shown in Fig. 2, the rod 32 extends forward to a point adjacent to the crossbar 10 and is then bent upon itself approximately at an angle of forty-five degrees, whereby the bent portion will extend at approximately a parallel line to the bar 10. And the portion of the rod lying parallel to the bar has fixedly secured thereto a bracket 33 which can be adjusted longitudinally of the bar 10. The bar 10 is further provided with a fixed bracket 34, in which the rod 32 is slidably mounted, the fixed bracket as shown being located to the inside of the bracket 33. The rod 32 is attached to the block 22, as shown more clearly in Fig. 4. The purpose of providing this slidable mounting for the rod 32 is to permit adjustment of the inner covering wheel in or out from the center of the planter. This is necessitated because of the variance in the width of the rows in which the corn is planted.

Taking the parts as shown in Fig. 2, in case it is desired to bring the rows closer together than is shown in this position, the dropping mechanism 8 and the shovels 9 are pulled toward the center of the machine the desired distance, and the bracket 33 is loosened from the plate 10 and moved inwardly along said plate until the inner covering wheel is in proper position with respect to the shovel. When moving the bracket 33 and the rod 32, the rod 20 will, of course, move therewith, since both the rods 20 and 32 are connected to the block 22 as shown more clearly in Fig. 4. But the rod 20 will swing around the pivotal center of the ball 19 during such adjustment, so that it will readily adjust itself to the proper angle given to it when the wheel is swung, without adjusting the mounting for said rod. This ball and socket connection permits movement in any direction of the rod 20 when the wheel 24 is moved in any direction during the various adjustments thereof. When it is desired to raise or lower the inner covering wheels, this is done by manipulating the segment and lever connection 17ª, which will raise or lower the lug 18. A scraper 34ª is provided for removing the accumulation of dirt from the edge of the inner covering wheel, which scraper is carried by the block 22.

The framework of the present invention comprises a lower frame 35 and an upper frame 36. As shown more clearly in Figs. 1, 2 and 3, these frames set one above the other. Hence, the length of the machine is materially foreshortened, and the weight of the body portion is centered more at one common point in the machine. By providing a short framework of this nature, the load is brought closer to the horses, which, of course, materially lightens the draft of the machine, since the closer the weight is placed to the neckyoke of the harness, the lighter will be the draft. The lower framework comprises a front rail 37, which is connected to the bar 10 by a plurality of rods 38. The main tongue 39 of the machine is secured to the bar 10 by a suitable fastening means 40, best shown in Fig. 2, and is secured to the front rail 37 by fastening means 41; and the tongue is further secured to the front rail by brace rods 42. The front rail is connected, at its ends, to a bar 43, best shown in Fig. 1. This bar carries and supports a pivoted plate 44, upon which are mounted the rollers 45, which engage with the knots on a check-row wire. The function and operation of these rollers are well known to anybody familiar with the art and a detailed description thereof will not be entered into at the present instance.

The bar 43 is pivotally connected to a link 46 which swings about the main shaft or axle 17, as best shown in Fig. 1. As shown in Fig. 2, the upper end of this link 46 is forked at 47 and interposed in the space between the forks is a collar 48, which is locked to the shaft 17. This construction prevents lateral movement of the forked end of the link 46 with respect to the shaft, but permits of a swinging movement of said link around the shaft.

A bar 49 serves to connect the front rail 37 to the shovels. As will be seen from the foregoing description, the bar 37 swings from a pivot, which is the center of the shaft 17, since the bars 37 and 43 swing in unison. The plate 44 carrying the rollers is rigidly connected to the bar 43. There is a rigid connection between the bar 37 and the shovels, in the form of the bar 49. The shovels are rigidly connected to the cross bar 10. The crossbar 10 is connected by links 11 to the crank arms 12. The crank arms are connected to the rock shaft 13. The rock shaft 13 is connected to the sleeves 16, and the sleeves 16 in turn are connected to the inner covering wheels 24. Hence, when the shovels 9 rise or fall, due to the irregularities of the ground, they carry with them the bar 37, the bar 43, the plate 44, the rollers 45, the bar 10, and the link 11, which actuates the crank arms 12, swings the rock shaft 13, which through its geared connection rocks the sleeves 16 around the shaft 17, swings the lug 18, and through the medium of the rod 20 raises or depresses the inner covering wheel. And this raising or depressing of the inner covering wheel is further accomplished by the swinging of the rod 32, which occurs simultaneously with the movement of the crossbar 10, since the rod and crossbar are rigidly connected through the bracket 34. Thus, when movement is imparted to the shovel which is the furthermost member of the planting mechanism engaging the ground, simultaneous movement is imparted to the balance of the planting mechanism, so that they are all moving in unison and their co-relation is maintained at all times. This eliminates the objectionable feature of having one portion of the mechanism rise or fall independently of the rest, producing a constant jarring of the parts. And, moveover, the shovel is located so closely to the center of the traction wheels 27 that when the shovels strike an uneven portion of the ground, the traction wheels strike this portion so soon afterward that the shovels are not thrown downward or upward when the traction wheels strike this portion, but both of them move practically simultaneously. This prevents the digging of the shovel too deep into the earth, or the skimming of the shovel over the top of the earth, both of which are undesirable in the planting operation.

When the inner covering wheels are raised or lowered by the actuations of the segment and lever mechanism 17$^a$, the crank arms 12 are moved, moving the links 11 and the bar 10, which raises the runners 9 and front rail 37, which in turn raises the bar 43 and plate 44. Thus the entire planting mechanism is raised or lowered simultaneously.

The upper frame comprises a front rail 50 and side rails 51, shown more clearly in Fig. 2. As shown in this figure, these rails are all formed from the same piece of metal; but, of course, this construction may be changed and they may be formed of separate pieces if desired. The upper frame is secured to collars 52, best shown in Fig. 3, which are loosely mounted upon the rock shaft 13. The side rails 51 of this upper frame extend beyond the collars 52, as best shown in Fig. 2, and have their ends connected to a seat 53. Sidewise movement of the upper frame with respect to the lower is prevented by arms 55 joined to the side rails of the frame. These arms 55 rest against the sides of the links 11, as best shown in Fig. 3.

Attached to arms 56, loosely mounted on the rock shaft 13, are the ends of bars 57, constituting a stub tongue 57$^a$, the other ends of these bars being connected to a clip 58, best shown in Fig. 1. The bars 57 of the stub tongue, as more clearly shown in Fig. 2, overlie the rails of the upper frame and are secured to the front rails 50 by a suitable clip 59. The point of juncture between this stub tongue and the main tongue is approximately midway the length of the main tongue, bringing it close to the center of movement of the entire planter, which is, of course, the point of juncture between the main tongue and the neckyoke of the harness. By this construction the upper frame is supported by the stub tongue, which is supported by the main tongue, and the upper frame in turn supports the rock shaft 13.

When the wheels, shovels, and planter mechanism are lifted from the ground a certain distance, but a very slight portion of this movement will be communicated to the upper frame. This is because of the fact that the movement at the point of juncture of the stub and main tongues will be slight, since this point is close to the center of movement of the entire device. Hence the movement communicated to the upper frame will be slight; and since this is the movement which directly affects the operator, the seat being carried by this upper frame, to all practical purposes, jolting of the operator will be eliminated. This is considered to be an important point in the present invention, since in all prior constructions, so far as I am aware, the connection between the frame carrying the seat and the frame carrying the planting mechanism has been far removed from the center of movement of the entire vehicle. Hence, the same degree of movement was imparted to the seat as was imparted to the traction wheels when the latter passed over an uneven portion of the ground.

By referring more particularly to Fig. 2, it will be seen that the center of the weight of the planting mechanism is the center of the shaft 17. This is because the bar 43 is connected to this shaft 17. The front rail 37 is connected to the bar 43; the shovels 9 are connected to the rail 37; the rail 10 is connected to the shovels 9; and the inner covering wheels are connected to the rails 10 through the medium of the link, crank arm, and gear connection heretofore described. Thus, the entire planting mechanism is carried by the front rail 37, which is connected to the bar 43 hung from the shaft 17, and the weight of the planting mechanism is centered at a point forward of the shaft 17, although it is bearing upon the shaft 17. The weight of this mechanism tends to draw the main tongue 39 downward, this tongue being connected to the front rail 37 and the crossbar 10. The center of the weight of the operator, when he is in proper position upon the seat, is the point of juncture between the main tongue 39 and stub tongue 57ª. The weight of the operator will tend to raise the front rail 50 of the upper frame 36, said weight being placed to the rear of the rock shaft 13, about which the upper frame swings. This in turn will raise the stub tongue 57ª, since these two members are connected by the clip 59. The weight of the operator will tend to raise the forward end of the stub tongue, and this movement will tend to raise the main tongue 39. Thus the weight of the planting mechanism tending to lower the main tongue will be counterbalanced by the weight of the operator, which will tend to raise the main tongue, and the weight of the body of the machine upon the neckyoke of the horses will be but slight.

A support is provided for the ends of a rock shaft 60, which operates the clutch mechanism 61 of the differential dropper. The rock shaft 60, as shown more clearly in Fig. 2, telescopes within a tube 60ª. This is to allow of an adjusting movement of the seed boxes. There is a feather key or other suitable connection between these parts so as to insure their unitary rotation. This clutch mechanism and dropper and the functions of the rock shaft do not enter into the present invention, and a detailed description thereof is not given at the present time. The rock shaft is provided, on its end, with a crank arm 62, which operates the valve in the shovel. This valve mechanism and its principle of operation is not a part of the present invention and is not described or illustrated in detail.

As best shown in Fig. 5, the crank arm 62 is provided with a lug 63, which is engaged by a pin 64 extending through the rock shaft 60. This permits the crank arm 62 to be moved simultaneously with the rock shaft when said shaft is oscillated in one direction, but permits of a non-action of the arm 62 when the shaft is moved in the opposite direction. A support for this shaft is formed by the bar 43, although the shaft is not actually mounted within said bar. The connection between the bar and the shaft is as follows: A casting 65 is provided, which consists of a body portion 66 having an opening 67 through which the shaft passes. The body portion has two of its faces finished to receive the ends of the angle iron constituting the front rail 37, and said rail is bolted or otherwise secured to these faces. Upon the sleeve 68 is mounted an upwardly extending lug or finger 69, to which is attached the bar 43.

It is understood that the shaft 20 is not keyed or secured in any way to the casting 65 or its component parts, and in order to prevent sidewise movement of the lug 69 upon the sleeve 68, a projection 70 is formed on the sleeve 68, which rests against the side of the lug and prevents movement in one direction, movement in the other being prevented by the engagement of the lug with the body portion of the casting, as best shown in Fig. 5.

In order to position the lug upon the sleeve a hole 71 is provided in the lug of a size to fit over the projection 70, and after it has been slipped over, the lug is given a quarter turn so as to bring the parts into the relative positions shown in Figs. 5 and 6. This arrangement permits rotation of the shaft 60, which rotation does not affect any of the supporting parts of the planting mechanism, and the motion of the supporting parts does not affect the rotation of the shaft 60.

As shown in Fig. 2, a cable 72 operates the catch to release the plate 44 and allow the rollers 45 to separate and release the check wire rollers. This cable, as shown, passes through a guide 73 secured to the rail 37, and passes along the frame in front of the hoppers containing the grain.

A plurality of holes 58ª are provided, as shown in Fig. 1, which permit of the adjustment of the bracket member 58, thus placing the point of juncture of the main and stub tongues nearer or farther from the forward end of the main tongue, in order to regulate the distance of the furrow openers from the point of ground contact of the traction wheels. Where the term runners is used in the claims, I intend to include furrow openers generally, unless otherwise indicated.

I claim:

1. In a corn planter, the combination of a framework, traction wheels carried by the framework, planting mechanism including furrow openers, which are located inside of and closely adjacent to the side of the traction wheels near the point of ground contact, the traction wheels being beveled toward the inside and serving as outer covering and carrying wheels, inner covering wheels of smaller diameter and beveled toward the outside, and located inside of and to the rear of the furrow openers, and having a separate axial bearing from the axle of the carrying wheels, and means for adjusting the inner covering wheels transversely and longitudinally of the furrow, substantially as described.

2. In a corn planter, the combination of a framework, traction wheels carried by the framework, planting mechanism including furrow openers, which are located inside of and closely adjacent to the side of the traction wheels near the point of ground contact, the traction wheels being beveled toward the inside and serving as outer covering and carrying wheels, inner covering wheels of smaller diameter and beveled toward the outside, and located inside of and to the rear of the furrow openers, and have a separate axial bearing from the carrying wheels and means for adjusting the inner covering wheels to vary the distance between said covering wheels and the traction wheels, substantially as described.

3. In a corn planter, the combination of a framework, traction wheels carried by the framework covering wheels independently adjustable toward and from the center of the machine, and seed boxes laterally adjacent to and inside of the rims of the traction wheels and independently adjustable toward and from the center of the machine, substantially as described.

4. In a corn planter, the combination of a framework, traction wheels carried by the framework and adjustable toward and from the center of the machine, seed boxes laterally adjacent to and inside of the rims of the traction wheels and adjustable toward and from the center of the machine, each seed box being provided with a discharge opening located on its outer side, and a furrow opener for each seed box, located immediately beneath said discharge opening and in close proximity to and inside of the adjacent traction wheel, and intermediate the traction wheel and seed box and serving to open the ground at a point immediately in front of and close to the point of ground contact of said traction wheel, substantially as described.

5. In a corn planter, the combination of a frame, traction wheels carried thereby and adjustable toward and from the center of the frame, seed boxes located inside of the rims of said wheels and laterally adjacent thereto, and adapted to be adjusted toward and from the center of the machine, and a telescoping-operating shaft for each of said seed boxes, adapted to permit of the adjustment thereof, substantially as described.

6. In a corn planter, the combination of a framework carrying the planting mechanism, a framework above the first mentioned framework supporting the seat, a connection between the two frames permitting said frames to move independently of one another, a stub tongue connected to one of the frames, and a main tongue connected to the other of said frames, and an adjustable connection between the two tongues, substantially as described.

7. In a corn planter, the combination of oppositely disposed runners, a bar connecting the runners, inner and outer covering wheels for each of the runners, a connection between the inner covering wheel and the bar, a rock shaft, a connection between the rock shaft and the bar, and lever and segment mechanism for actuating the rock shaft to adjust the runners and covering wheels with respect to the ground line, substantially as described.

8. In a corn planter, the combination of oppositely disposed runners, a bar connecting the runners, inner covering wheels for each of the runners, a rock shaft, a connection between the rock shaft and bar, traction wheels serving as outer covering wheels, a shaft upon which the traction wheels are mounted, a sleeve loosely mounted on said shaft, a connection between the sleeve and rock shaft, a connection between the sleeve and inner covering wheel, and lever and segment mechanism for actuating the rock shaft to adjust the runners and covering wheels with respect to the ground line, substantially as described.

9. In a corn planter, the combination of oppositely disposed runners, a bar connecting the runners, inner covering wheels for each of the runners, a rock shaft, a connection between the rock shaft and bar, traction wheels serving as outer covering wheels, a shaft upon which the traction wheels are mounted, a sleeve loosely mounted on said shaft, a connection between the sleeve and rock shaft, a connection between the sleeve and inner covering wheel, including a universal joint, and lever and segment mechanism for actuating the rock shaft to adjust the runners and covering wheels with respect to the ground line, substantially as described.

10. In a corn planter, the combination of a tongue, a frame supporting the planting mechanism, a connection between the tongue and frame, traction wheels, the connection between the tongue and frame extending from a point below the axial center of the traction wheels, a frame supporting the seat, a connection between the seat supporting frame and tongue, extending from a point above the axial center of the traction wheels, whereby the weight of the operator exerts a pressure in one direction on the tongue, and the weight of the planter mechanism exerts a pressure in the opposite direction, substantially as described.

11. In a corn planter, the combination of a tongue, a frame supporting the planting mechanism, a connection between the tongue and frame, traction wheels, the connection between the tongue and frame extending from a point below the axial center of the traction wheels, a frame supporting the seat located above the first mentioned frame, a connection between the seat supporting frame and tongue, extending from a point above the axial center of the traction wheels, whereby the weight of the operator exerts a pressure in one direction on the tongue, and the weight of the planter mechanism exerts a pressure in the opposite direction on the tongue, substantially as described.

12. In a corn planter, the combination of a lower frame supporting planter mechanism, traction wheels, said lower frame lying below the axial center of the traction wheels and having its center of weight forward of the axial center of the traction wheels, an upper frame located above the axial center of the traction wheels and extending to the front and rear of the axial center of the traction wheels, a seat for the operator upon the rear of the upper frame, a tongue, a connection between the lower frame and tongue, and a connection between the upper frame and tongue, substantially as described.

13. In a corn planter, the combination of an upper and a lower frame, a front rail on the lower frame, planter mechanism, including runners, a connection between the front rail and the runners, a crossbar forming a portion of the lower frame, a connection between the crossbar and runners, a rock shaft supported by the upper frame, a connection between the rock shaft and crossbar, inner and outer covering wheels, and a connection between the inner covering wheels and the rock shaft, substantially as described.

14. In a corn planter, the combination of an upper and a lower frame, a front rail on the lower frame, planter mechanism, including runners, a connection between the front rail and the runners, a crossbar forming a portion of the lower frame, a connection between the crossbar and runners, a rock shaft supported by the upper frame, a connection between the rock shaft and crossbar, inner and outer covering wheels, and a connection between the inner covering wheels and the rock shaft, said upper frame being swingingly mounted on said rock shaft, substantially as described.

15. In a corn planter, the combination of an upper and a lower frame, a front rail on the lower frame, planter mechanism, including runners, a connection between the front rail and the runners, a crossbar forming a portion of the lower frame, a connection between the crossbar and runners, a rock shaft supported by the upper frame, links connecting the crossbar and rock shaft, members carried by the upper frame and bearing against said links, and serving to prevent sidewise movement between the frames, substantially as described.

16. In a corn planter, the combination of an upper and a lower frame, a front rail on the lower frame, planter mechanism, including runners, a connection between the front rail and the runners, a crossbar forming a portion of the lower frame, a connection between the crossbar and runners, a rock shaft supported by the upper frame, a connection between the rock shaft and crossbar, inner and outer covering wheels, a connection between the inner covering wheels and rock shaft, a plate carrying the check-row wire rollers, and a connection between the front rail and roller carrying plate, substantially as described.

17. In a corn planter, the combination of an upper and a lower frame, a front rail on the lower frame, planter mechanism, including runners, a connection between the front rail and the runners, a crossbar forming a portion of the lower frame, a connection between the crossbar and runners, a rock shaft supported by the upper frame, a connection between the rock shaft and crossbar, inner and outer covering wheels, a connection between the inner covering wheels and rock shaft, a plate carrying the check-row wire rollers, and a connection between the front rail and roller carrying plate in the form of a bar swinging about the axial center of the traction wheels, substantially as described.

18. In a corn planter, the combination of an upper and a lower frame, a front rail on the lower frame, planter mechanism, including runners, a connection between the front rail and the runners, a crossbar forming a portion of the lower frame, a connection between the crossbar and runners, a rock shaft supported by the upper frame, a connection between the rock shaft and crossbar, inner and outer covering wheels, a connection between the inner covering wheels and rock shaft, variable feed mechanism, including a rock shaft, a member supporting the ends of said rock shaft, said members also serving as a support for the front rail of the lower frame, said member being rigidly secured to the front rail and loosely mounted on said rock shaft, substantially as described.

19. In a corn planter, the combination of an upper and a lower frame, a front rail on the lower frame, planter mechanism, including runners, a connection between the front rail and the runners, a crossbar forming a portion of the lower frame, a connection between the crossbar and runners, a rock shaft supported by the upper frame, a connection between the rock shaft and the crossbar, inner and outer covering wheels, a connection between the inner covering wheels and rock shaft, a plate carrying the check-row wire rollers, a bar secured to said plate, one end of the bar being rigidly engaged to said supporting member, the other end of said bar being pivotally mounted on the center of the traction wheels, substantially as described.

20. In a corn planter, the combination of a frame, traction wheels carried thereby and adjustable toward and from the center of the frame, seed boxes located inside of the rims of said wheels and laterally adjacent thereto, and adapted to be adjusted toward and from the center of the machine, a telescoping-operating shaft for each of said seed boxes, adapted to permit of the adjustment thereof, and furrow openers located immediately beneath the sides of said seed boxes and in communication therewith and intermediate the seed box and traction wheels, and laterally adjacent to and inside of the traction wheels, substantially as described.

21. In a corn planter, the combination of a frame, traction wheels carried thereby and adjustable toward and from the center of the frame, seed boxes located inside of and laterally adjacent to the traction wheels, and adjustable toward and from the center of the machine, furrow openers located below the outer sides of said seed boxes and intermediate the seed box and traction wheels, and inner covering wheels of smaller diameter than the outer covering wheels, and located below the center and to the rear thereof, and adjustable transversely and longitudinally of the furrow, substantially as described.

22. In a corn planter, the combination of a frame, traction wheels carried thereby and adjustable toward and from the center of the frame, seed boxes located inside of and laterally adjacent to the traction wheels, and adjustable toward and from the center of the machine, furrow openers located below the outer sides of said seed boxes and intermediate the seed box and traction wheels, and inner covering wheels of smaller diameter than the outer covering wheels, and located below and to the rear of the centers thereof, and adjustable transversely and longitudinally of the furrow, the rims of the outer covering wheels being beveled toward their inner sides, and the rims of the inner covering wheels being beveled toward their outer sides, substantially as described.

FRANK P. MURPHEY.

Witnesses:
WM. P. BOND,
MARY R. FROST.

Copies of this patent may be obtained for five cents each, by addressing the "Commissioner of Patents, Washington, D. C."